(12) United States Patent
Gerber

(10) Patent No.: US 7,486,200 B2
(45) Date of Patent: Feb. 3, 2009

(54) RECREATIONAL VEHICLE PASSING WARNING DEVICE

(76) Inventor: Allen Gerber, 42 Nutmeg Rd., Aligerville, NY (US) 12440

( * ) Notice: Subject to any disclaimer, the term of this patent is extended or adjusted under 35 U.S.C. 154(b) by 196 days.

(21) Appl. No.: 11/455,567

(22) Filed: Jun. 19, 2006

(65) Prior Publication Data
US 2007/0290822 A1    Dec. 20, 2007

(51) Int. Cl.
*G08G 1/16* (2006.01)
(52) U.S. Cl. ............ 340/903; 340/901; 340/425.5; 340/435
(58) Field of Classification Search ............ 340/903, 340/435, 436, 425.5, 901, 438
See application file for complete search history.

(56) References Cited

U.S. PATENT DOCUMENTS

| | | | |
|---|---|---|---|
| 5,463,384 A | 10/1995 | Juds | |
| 5,530,447 A | 6/1996 | Henderson et al. | |
| 5,845,038 A * | 12/1998 | Lundin et al. | 362/551 |
| 6,243,632 B1 * | 6/2001 | Jung | 701/45 |
| 2003/0005757 A1 | 1/2003 | Breed | |
| 2005/0252708 A1 * | 11/2005 | Theisen | 180/268 |
| 2005/0258977 A1 | 11/2005 | Kiefer et al. | |
| 2005/0275514 A1 | 12/2005 | Roberts | |
| 2006/0041381 A1 * | 2/2006 | Simon et al. | 701/301 |

* cited by examiner

*Primary Examiner*—Brent Swarthout
(74) *Attorney, Agent, or Firm*—Lawrence D. Cutter, Esq.

(57) ABSTRACT

The present invention provides a warning apparatus for an automotive vehicle. The apparatus includes an air pressure sensor mounted on a side of the vehicle. This sensor provides an indication which is a function of sensed local air pressure. A connection mechanism is provided between the sensor and an indicator which provides an indication of the pressure to a driver of the vehicle. The pressure sensor thus provides an indication, alert, warning or indicator with respect to the closeness of a passing vehicle.

19 Claims, 6 Drawing Sheets

RECREATIONAL VEHICLE PASSING WARNING DEVICE

TECHNICAL FIELD

The present invention is directed to sensing devices that provide a warning that a vehicle is about to be passed on the highway. More particularly, the present invention is directed to devices and systems for sensing pressure variations induced when vehicles that tend to have large flat sides are passed in either direction by similarly dimensioned and shaped vehicles.

BACKGROUND OF THE INVENTION

When vehicles such as recreational vehicles are passed in either direction by other, similarly dimensioned vehicles such as a tractor trailer combination, there is a force exerted tending to pull the vehicles together. This can result in accidents, especially when the force is unexpected. Since drivers' concentrations tend to be focused directly ahead and not in the rear view mirrors, it is quite possible that a vehicle and its driver will experience this force when nothing is expected. In short, this force can be produced when a driver is least expecting it and is thus least apt to act properly.

The existence of this force is sufficiently well know that there is a product provided, primarily for recreational vehicles that is designed to counteract the force induced by passing vehicles. The product is called "Safe Steer" and is available from Camping World, based in Bowling Green, Ky. This device provides an assisted steering action operating against sudden vehicles pulling, such as a sudden pull to the left. Citation to this device is provided to indicate that the problem addressed herein has been recognized by others who have provided a passive solution to the problem.

The present invention is primarily directed to the situation in which a recreational vehicle is passed on the left by a truck trailer combination (a so-called "semi"). However, the present invention is equally applicable to any situation in which vehicles are passing from either direction and on either side, left or right. It is applicable to situations in which the vehicles pass one another in opposite directions as well. It is also applicable to situations in which only one of the vehicles is "large." By "large" is meant of sufficient size to produce a horizontal force noticeable to a driver of the vehicle being passed (again, from either side or from either direction).

SUMMARY OF THE INVENTION

The present invention is a warning apparatus for an automotive vehicle. The apparatus comprises an air pressure sensor mounted on a side of the vehicle. This sensor provides an electrical indication which is a function of sensed local air pressure. A connection mechanism is provided between the sensor and an indicator which provides an indication of the pressure to a driver of the vehicle.

It is therefore an object of the present invention to provide a warning and/or alerting signal to a driver that another, larger vehicle is in the vicinity.

It is also an object of the present invention to reduce the risk of highway accidents, especially those involving tractor trailers, campers and recreational vehicles.

It is a still further object of the present invention to provide an indication to a driver that his or her vehicle is being passed.

It is yet another object of the present invention to provide an indication to a driver of the location of a nearby vehicle, especially a large one.

It is yet another object of the present invention to provide a safety sensor in a manner which is easily retrofitted to existing vehicles.

It is also an object of the present invention to provide an indication of the degree of vehicle closeness as a function of sensed air pressure.

It is a still further object of the present invention to provide a vehicle which is already equipped with the sensors and alerting devices described herein.

Lastly, but not limited hereto, it is an object of the present invention to provide a system which employs a plurality of sensors.

Additional features and advantages are realized through the techniques of the present invention. Other embodiments and aspects of the invention are described in detail herein and are also considered a part of the claimed invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

A description of the present invention is best begun with consideration of the circumstances in which it is most useful. Accordingly, attention is directed to FIG. 1 which illustrates a standard four lane highway 200 having shoulder markings 201 and 205. A double line 203 (a center double yellow line is typical in the U.S.) is provided which separates traffic going in opposite directions, as shown by the four traffic flow arrows. Driving on the right side of the road is depicted here, but the present invention is not limited to such circumstances. Each of the two lanes carrying traffic in a single direction is provided with broken lines 202 and 204, respectively. The illustration is not represented as being to scale nor in compliance with any specific state, national or federal roadway specifications. It does, however, represent several circumstances in which the present invention is deployed and its usefulness.

Figure 1:
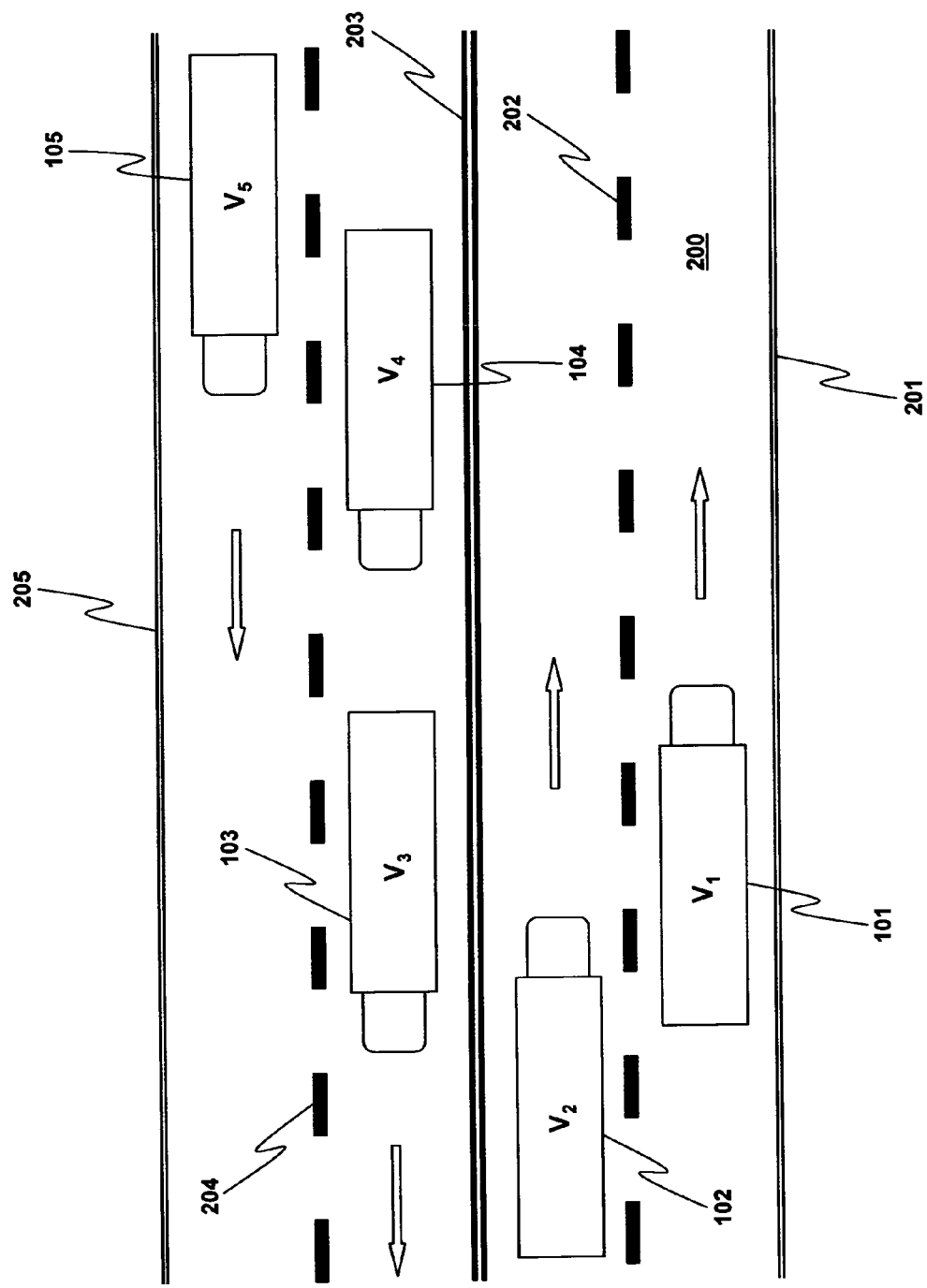
FIG. 1 is a top plan view illustrating the environment and several situations where the present invention is employed.

The highway portion shown in FIG. 1 is populated with five vehicles 101-105, also designated as vehicles $V_1$-$V_5$. Each of the vehicles shown is a relatively large vehicle such as a tractor trailer, truck, tandem vehicle, bus or the like since these are the vehicles which tend to be mainly responsible for the problem addressed herein. However, it is noted that there is a trade off between vehicle size and vehicle proximity in passing so that even relatively small vehicles passing closely can produce the problem addressed. Accordingly, while FIG. 1 shows the presence of relatively large vehicles both as a vehicle which is causing a problem and as a vehicle to which an unexpected force might be applied, it should be understood that this is for illustrative purposes only and that smaller vehicles are also intended to be covered by the description herein.

Consider, for example, vehicle 101, which for exemplary purposes might be though of as being a recreational vehicle. Vehicle 101 is being passed from behind and on the left by vehicle 102. In so doing, the flow of air between these vehicles can produce a force tending to pull vehicle 101 to the left. If this force is not expected and/or not properly compensated for by the driver of vehicle 101, the vehicles could come into close and dangerous proximity and even come into contact. The present invention seeks to provide the driver of a vehicle, such as vehicle 101 above, that circumstances exist for such a force to occur. In short, the present invention provides a driver with an indication that another vehicle is alongside or passing in the other direction.

The present invention is also seen to be operative in some of the other circumstances that are shown in FIG. 1. For example, if vehicle 104 is passed on the right by vehicle 105 going in the same direction, a device in accordance with the present invention that is mounted on the right rear side of vehicle 104 would detect the presence of vehicle 105. (See reference numeral 300.2 in FIG. 2 for an indication of this placement.) Likewise, when vehicle 102 is passed by vehicle 103 going in the opposite direction, a device in accordance with the present invention mounted on the left front side of vehicle 102 would be effective to provide an indication of this fact. (See reference numeral 300.3 in FIG. 2 for an indication of this placement.)

Figure 2:
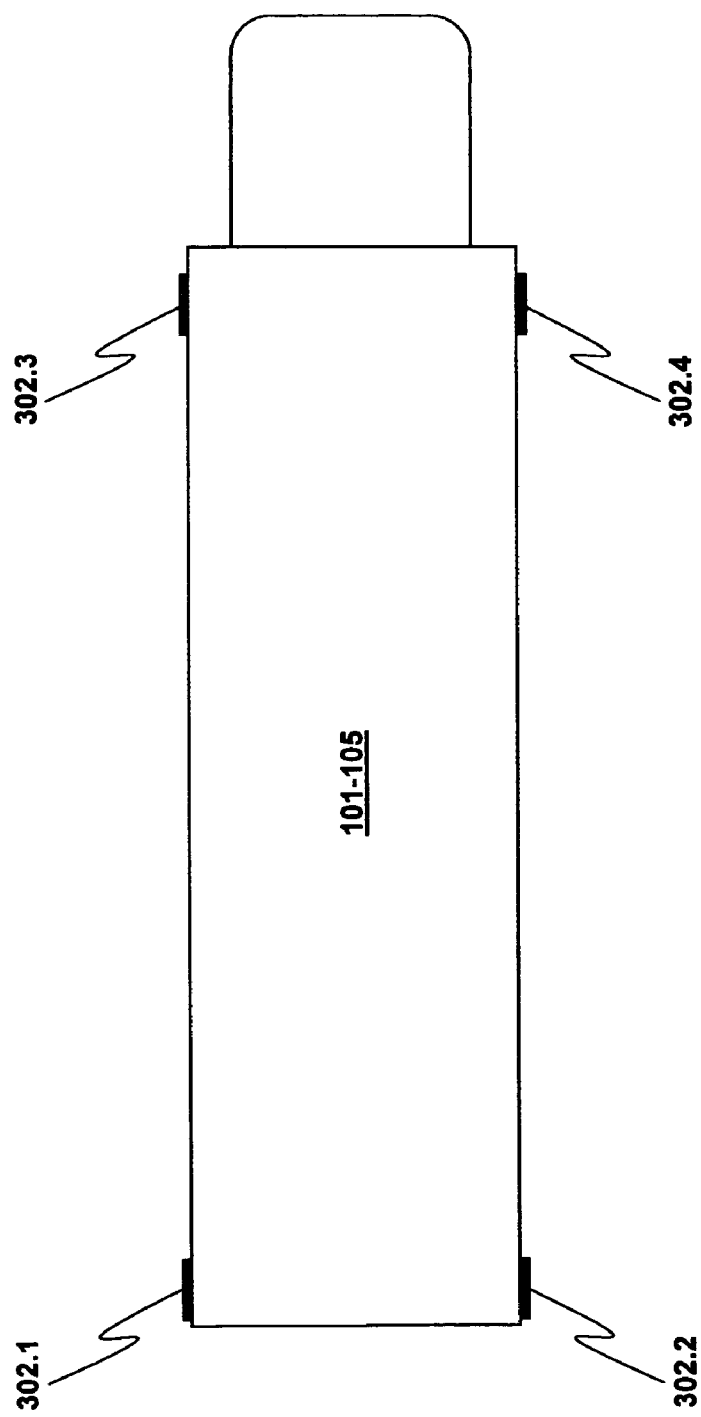
FIG. 2 is a top plan view illustrating locations on vehicles where the pressure sensor is most beneficially deployed.

FIG. 2 illustrates locations where air pressure sensors and/or air pressure transducers are preferably placed. If a vehicle were to be provided with only two devices in accordance with the present invention, the location evidenced by sensors 302.1 or 302.2 would be preferable in so far as rear locations are the ones most likely to provide useful information in most real world circumstances. Sensors 300.1-300.4 are placed on a vehicle as shown. Placement in the vertical direction (height from the road surface) is not critical. However, mid-line placement is preferred as being a location most sensitive to air stream induced effects. Sensors 302.1-302.4 are devices which are capable of sensing air pressure and which are capable of producing an electrical signal which is function of the air pressure sensed.

Figure 3:
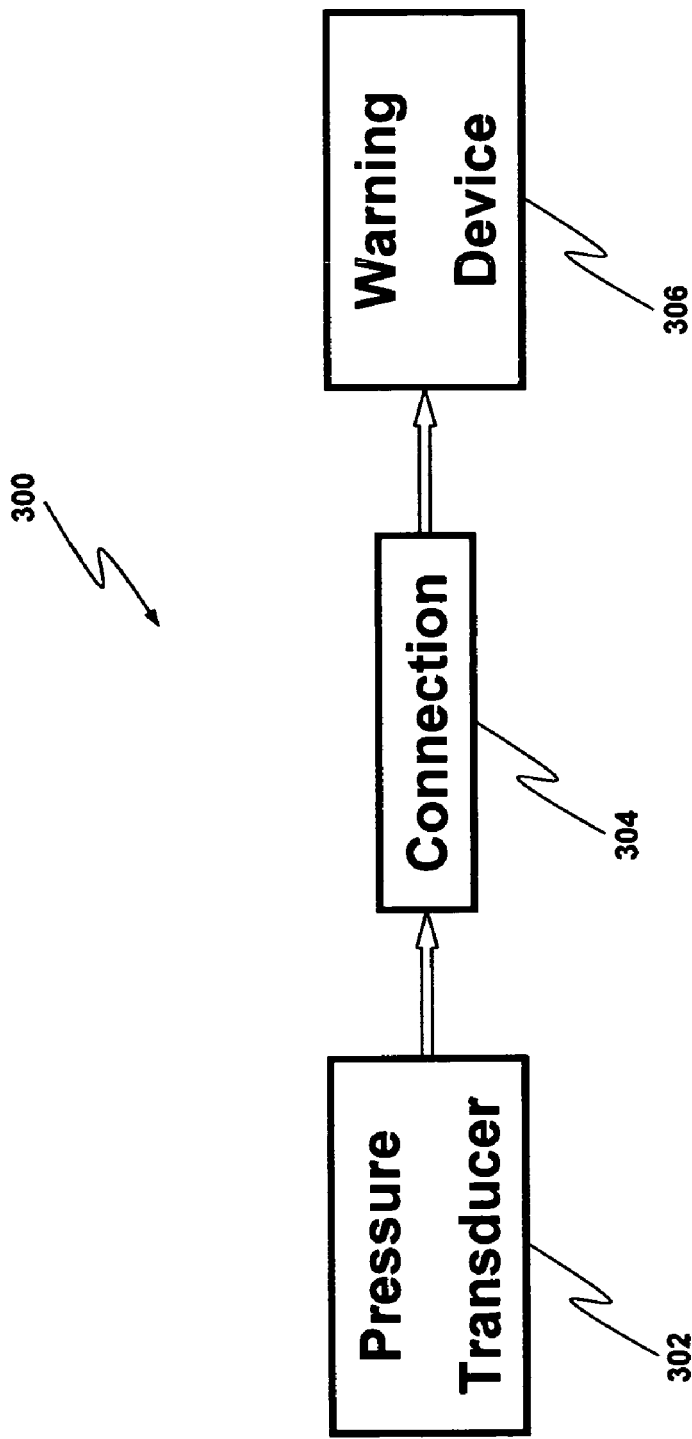
FIG. 3 is a block diagram illustrating the overall structure of the device of the present invention.

FIG. 3 illustrates components present in apparatus 300 of the present invention. In particular, pressure transducer (sensor) 302 is disposed on the side of a vehicle as discussed above and as is shown in FIG. 2. The electrical signal from transducer 302 is supplied to warning device 306 via connection 304. Connection 304 comprises any convenient mechanism for the transfer of the information present in the electrical signal from air pressure transducer 302. For example, in its simplest form connection 304 is a wire. However, for purposes of providing retrofittability, connection 304 is a transmitter of electromagnetic waves modulated by the electrical signal from transducer 302. The signal transmitted in this fashion may be an analog signal or a digital signal. Furthermore, it is contemplated that transducer 302 may in some embodiments provide an electrical signal that is already in digital form. The analog or digital nature of the signal transferred to warning device 306 is not at all critical to the practice of the present invention. Connection 304 may also represent electrical or fiber optic busses present in a vehicle, especially for vehicles for which the invention is a factory option or standard component.

Warning device 306 is any convenient mechanism for providing an indication of sensed air pressure or changes in sensed air pressure to a driver or vehicle occupant. Warning device 306 typically comprises an audio or visual signal to the driver. However, tactile signals such as car seat or shirt pocket vibrator may also be employed. In general, warning device 306 includes any mechanism which provides input to the sensory systems of the driver. Warning device 306 may comprise a digital or analog display of the actual pressure reading together with an auditory and/or visual indication. Warning device 306 may also include multiple display modalities for each sensor deployed. For example, warning device 306 may present an analog or digital view of each one of the sensors present. Multiple sensors disposed along the side of a vehicle may also be deployed and sensed serially to provide an increasingly loud (or bright or otherwise strong) signal indicating that the passing vehicle is getting closer and closer to being directly opposite the vehicle being passed. (See the discussion of FIG. 4 below for the situation in which multiple sensors are present.) Warning device 306 may also include a microprocessor for control and analysis of signal input and for control of a signal to be provided to the driver. The audible warning aspects of device 306 may also include replays of recorded human voice indications such as: "Vehicle passing on the left," "Vehicle now directly opposite; use caution," or "Vehicle too close, take evasive action." Warning device 306 may also provide an initial visual warning but with increased pressure indications, elevate this to an auditory warning as well. Warning device 306 may also include a mechanism which provides the user/driver with the ability to set a threshold pressure level or pressure difference level indication for providing the desired warning. In this way then, the system of the present invention is provided with a sensitivity control. The system is setable to detect large "eighteen wheelers" while ignoring cars and/or smaller trucks. Warning device 306 is also preferably provided with variable levels of "warning intensity" (that is, louder auditory warning or brighter or more frequently flashing video or optical display) to suit the age or inclinations of the driver.

Figure 4:
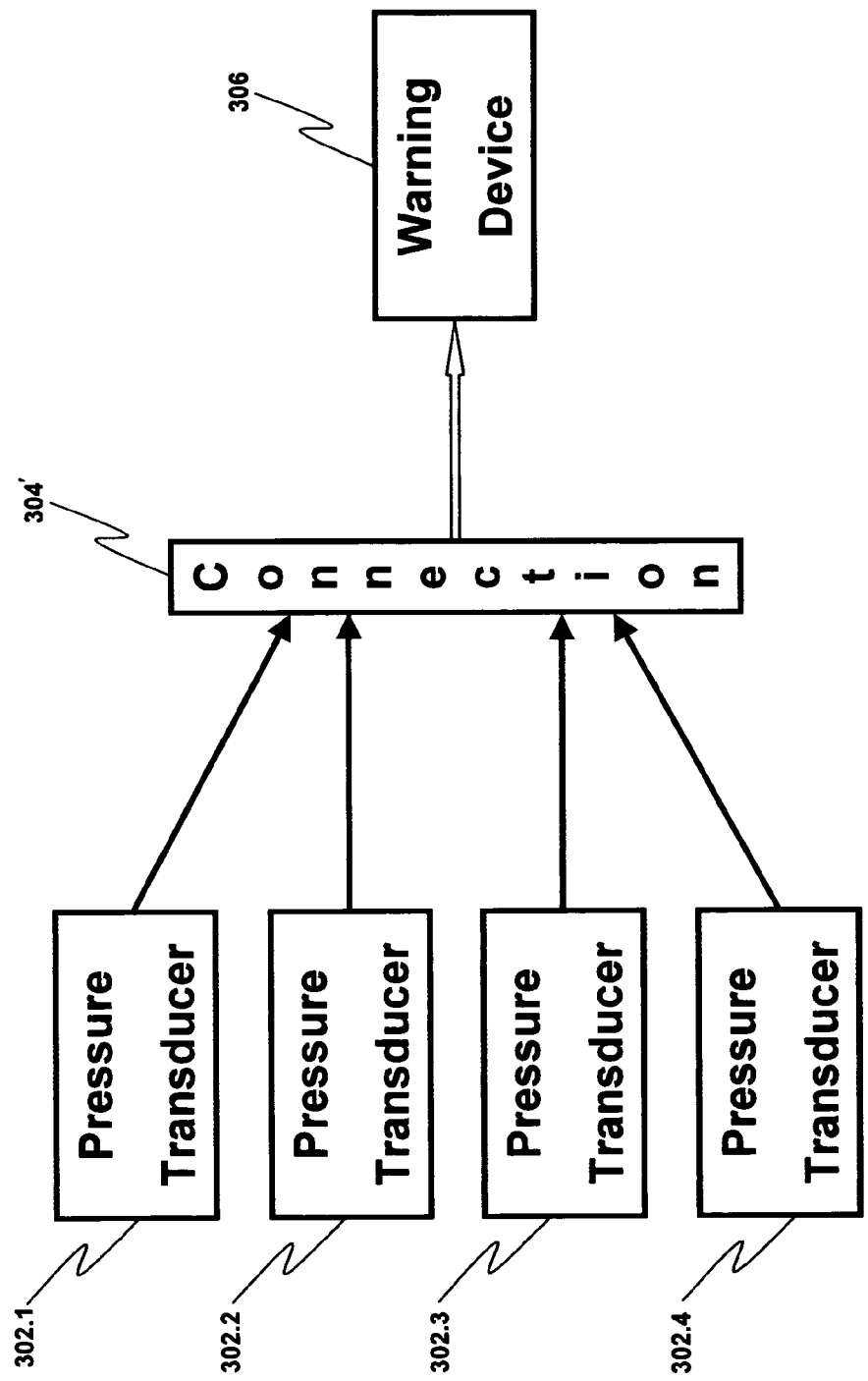
FIG. 4 is a block diagram illustrating a configuration of the present invention in which there are a plurality of sensors deployed.

Attention is next directed to FIG. 4 which illustrates the situation in which a plurality of sensors 302.0-302.4 are employed. Such an arrangement of four sensors is also seen in FIG. 2. In situations where a plurality of sensors 302 are employed, it is preferred that they be provided with a common connection 304' to warning device 306. If connection 304' is a wire, then it is merely a bundled harness of four wires. However, connection 304' is also implementable as a wireless device which receives four wires from sensors 302.1-302.4, respectively, and transmits a combined signal to warning device 306 which includes a receiver and a decoding circuits to sort out the four combined pieces of information which may be provided in any conveniently coded fashion, be it analog or digital.

As used herein, the term vehicle refers to any automotive means of road, street, turnpike, expressway or highway transportation. Such transportation means may be powered by any convenient motor or engine and be adapted to operate on any and all fuels used for carrying out the function of moving goods or people.

As described above, sensors 302 are devices which react to air pressure or air pressure changes and produce a corresponding electrical signal. However, it is noted that these sensors can also include devices which are responsive in the same manner to an increase in noise or sound level, such as those which occur when a large vehicle is approaching. These too are usable in the same fashion as air pressure sensors in the warning system described above.

With a view toward near future vehicle design, it is noted that the driver of the vehicle discussed above may be a robot, servomechanical device or similar automatic vehicle control system. In such cases, the robot or control system receives signals from the sensors and controls the vehicle in anticipation of the horizontal force that is forthcoming due to the passing vehicle. Accordingly, as used herein the term "driver" also includes human beings, automatic control systems and even anthropomorphic robotic units.

While the invention herein has so far been couched in terms of providing warning to either a human or robot driver, it is also noted that the sensors may also be employed as a means for activating a resistance mechanism which makes it harder for the vehicle being passed to be steered in the direction of the passing vehicle.

The sensors of the present invention are also usable with additional sensing devices which operate to detect lateral motion of the vehicle. These additional sensors also function to detect not only lateral acceleration of the vehicle but forward acceleration and braking actions as well. Such sensors are easily provided as relatively massive bodies mounted on flexible, vertically upright shafts. The "relativeness" of the mass is determined by the degree of flexibility present in the shaft. The presence of these detectors provides a greater granularity of signals that are used to assist in mechanical control of the vehicle in the face of approaching and/or passing vehicles. The signals used for this control also include the speed of the vehicle which is a signal which is already present and available in newer vehicles, especially those with computer controlled engine functions. These sensors are also usable in place of the air pressure (molecular density) sensors described above since lateral motion is often a consequence of the vehicle passing action or even by unexpected wind gusts. These motion sensors provide a degree of predictive information concerning the path of the vehicle, especially around curves.

While the invention above has been described in terms of its use on highway vehicles, it is also possible to employ the present invention in trains. It is known that trains passing in opposite directions approach each other very quickly and with the noise and energy levels that are associated with trains, there is a very real chance that a significant number of passengers are alarmed or startled by the event. The present invention provides a mechanism to provide a prior warning tone or voice over a PA (Public Address) system.

Figure 5:
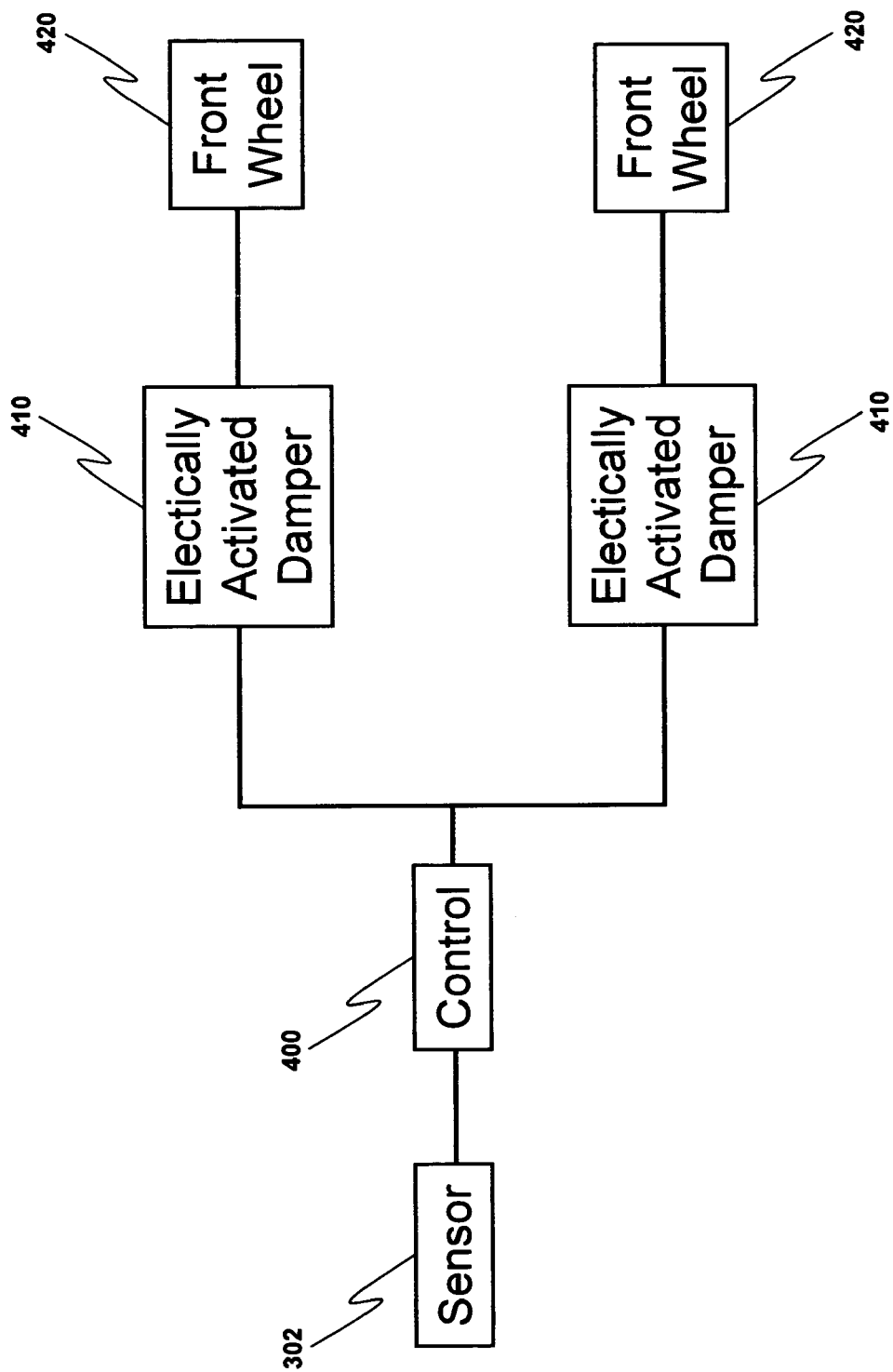
FIG. 5 is a block diagram illustrating the use of sensors to provide a steering control function.
Figure 6:
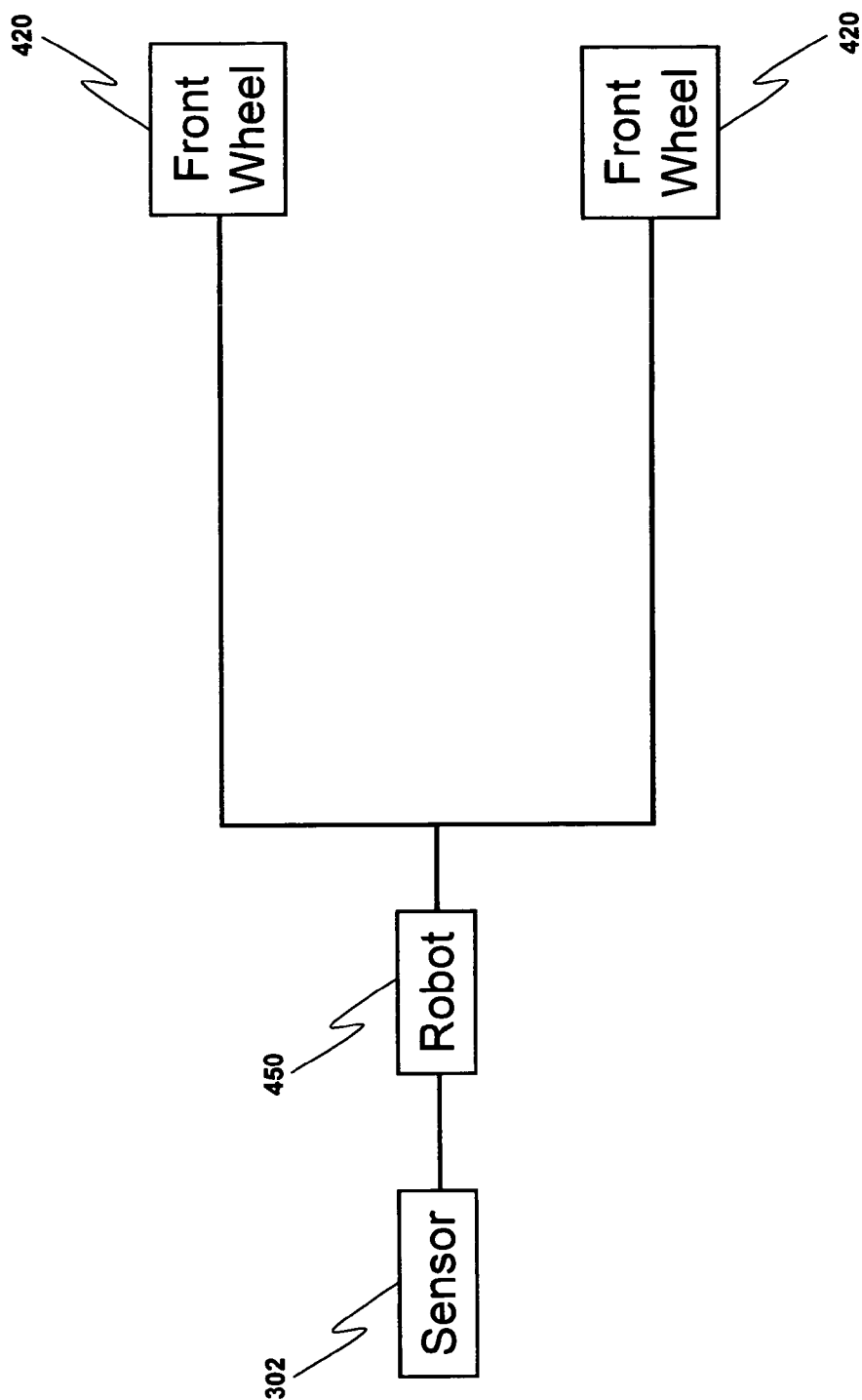
FIG. 6 is a block diagram similar to FIG. 5 except illustrating the situation in which the sensors are used to provide input to a robot mechanism which controls the vehicle.

The present invention thus contemplates the situation in which the vehicle itself is controlled in response to the detection of a passing vehicle. FIG. 5 illustrates such a system. Sensor 302 provides an electrical signal to control 400 which, when a threshold level is reached, activates electrically driven dampers 410 which provide additional resistance against steering motions of front wheels 420 either to the left or right depending on the location of the sensor or sensors 302.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A warning apparatus for a vehicle comprising:
   an air pressure sensor mounted on a side of the vehicle said sensor being positioned to measure pressure changes induced by passing vehicles, said sensor providing an electrical signal which is a function of sensed air pressure; and
   means for providing an interpretation of said signal to a driver of said vehicle.

2. The apparatus of claim 1 in which said means is a directly wired connection to a signaling device within range of said driver.

3. The apparatus of claim 2 in which said signaling device is visual.

4. The apparatus of claim 2 in which said signaling device is auditory.

5. The apparatus of claim 2 in which said signaling device is tactile.

6. The apparatus of claim 2 in which said signaling device provides an indication of said pressure.

7. The apparatus of claim 2 in which, in addition to an indication of said pressure, said signaling device also provides a warning that said pressure exceeds a predetermined value.

8. The apparatus of claim 7 in which said predetermined value is selectable.

9. The apparatus of claim 1 in which means is analog.

10. The apparatus of claim 1 in which said means is digital.

11. The apparatus of claim 1 in which said means is a wireless transmitter receiving said electrical indication and transmitting same to a receiver which actuates a signaling device within range of said driver.

12. The apparatus of claim 1 in which said means comprises an electrically conductive wire connecting said sensor to a signaling device within range of said driver.

13. The apparatus of claim 1 in which said means comprises an electrically conductive wire connecting said sensor to a signaling device within range of said driver.

14. The apparatus of claim 1 in which said means comprises an optic fiber connecting said sensor to a signaling device within range of said driver.

15. The combination of a vehicle and the warning apparatus of claim 1.

16. A transportation mechanism comprising:
    an automotive vehicle;
    at least one air pressure sensor mounted on a side of said vehicle said sensor being positioned to measure pressure changes induced by passing vehicles, said sensor providing an electrical indication which is a function of sensed air pressure; and
    means for providing said indication to a driver of said vehicle.

17. The transportation mechanism of claim 16 in which there are a plurality of said sensors.

18. The transportation mechanism of claim 16 in which said indication providing means provides a separate indicator for each sensor.

19. The transportation mechanism of claim 17 in which said sensors are connected to said indication providing means via a common signal path.

* * * * *